US012650320B2

(12) United States Patent
Leisenheimer et al.

(10) Patent No.: US 12,650,320 B2
(45) Date of Patent: Jun. 9, 2026

(54) DEVICE FOR THE MAGNETIC-FIELD-BASED DETERMINATION OF ROTATIONAL AND/OR TILTING MOVEMENTS

(71) Applicant: Infineon Technologies AG, Neubiberg (DE)

(72) Inventors: Stephan Leisenheimer, Oberhaching (DE); Jakob Valtl, Munich (DE)

(73) Assignee: Infineon Technologies AG, Neubiberg (DE)

( * ) Notice: Subject to any disclaimer, the term of this patent is extended or adjusted under 35 U.S.C. 154(b) by 128 days.

(21) Appl. No.: 18/602,598

(22) Filed: Mar. 12, 2024

(65) Prior Publication Data

US 2024/0310189 A1      Sep. 19, 2024

(30) Foreign Application Priority Data

Mar. 14, 2023    (DE) .......................... 102023202290.7

(51) Int. Cl.
G01D 5/14        (2006.01)
H01F 7/02        (2006.01)
(52) U.S. Cl.
CPC .......... G01D 5/145 (2013.01); H01F 7/0273 (2013.01)
(58) Field of Classification Search
CPC ..................................................... G01D 5/145
See application file for complete search history.

(56) References Cited

U.S. PATENT DOCUMENTS

| | | | |
|---|---|---|---|
| 6,566,619 B2 | 5/2003 | Gillman et al. | |
| 10,950,377 B2 * | 3/2021 | Ausserlechner | ........ G01P 3/487 |
| 11,248,934 B2 * | 2/2022 | Heinz | ...................... G05G 1/08 |
| 11,255,699 B2 | 2/2022 | Hammerschmidt et al. | |
| 2009/0278529 A1 | 11/2009 | Malik et al. | |
| 2021/0205602 A1 * | 7/2021 | Richert | .............. F04D 29/0476 |

FOREIGN PATENT DOCUMENTS

| | | |
|---|---|---|
| DE | 10117597 C1 | 11/2002 |
| DE | 102019209035 A1 | 12/2020 |

* cited by examiner

*Primary Examiner* — Reena Aurora
(74) *Attorney, Agent, or Firm* — Harrity & Harrity, LLP

(57) ABSTRACT

A device for the magnetic-field-based determination of rotational and/or tilting movements, including a permanent magnet which is rotatable on both sides about a rotation axis and is tiltable on both sides along a tilting axis extending orthogonally to the rotation axis, two magnetic field sensors which are each configured to measure magnetic vector fields in at least two dimensions, namely at least parallel to the rotation axis and parallel to the tilting axis of the permanent magnet, wherein the magnetic field sensors are arranged on a common substrate and are arranged next to one another along a straight line parallel to the rotation axis of the permanent magnet, and wherein the magnetic field sensors are spaced apart from the outer surface of the permanent magnet.

20 Claims, 7 Drawing Sheets

DEVICE FOR THE MAGNETIC-FIELD-BASED DETERMINATION OF ROTATIONAL AND/OR TILTING MOVEMENTS

CROSS-REFERENCE TO RELATED APPLICATION

This application claims priority to German Patent Application No. 102023202290.7 filed on Mar. 14, 2023, the content of which is incorporated by reference herein in its entirety.

TECHNICAL FIELD

The innovative concept described herein relates to the technical field of ascertaining positions and movements using magnetic field sensors.

SUMMARY

In many applications, the position of a specific component needs to be determined as precisely as possible. This can be done using magnetic field sensors, for example. The component of which the position is to be determined can either be magnetic itself or can be provided with a magnet. Movement of the component then causes a change in the magnetic field, which can be ascertained using a magnetic field sensor.

The magnetic field is a vector field, wherein the magnetic field lines emanating from a magnet have a magnitude and a direction. Magnetic field sensors can be sensitive in a specific preferred direction, e.g., they measure magnetic fields of which the magnetic field lines run in a specific direction. Some magnetic field sensors can measure magnetic fields in two spatial directions, e.g., within a plane in the x and y directions. These sensors are also referred to as two-dimensional sensors or 2D sensors. There are also three-dimensional sensors or 3D sensors that can measure magnetic field lines in all three spatial directions, e.g., in the x, y, and z directions.

Common magnetic field sensors can take the form of Hall sensors or magnetoresistive sensors, for example. Hall sensors can, for example, have one or more Hall elements, wherein each Hall element is sensitive in a specific preferred direction. For example, a 3D Hall sensor can be constructed with three Hall elements, each measuring in a different spatial direction.

A change in the position of a magnet relative to a magnetic field sensor causes a change in the magnetic field, which can be measured with the magnetic field sensor. Position changes due to translational and/or rotational movements can be detected here.

One advantage of magnetic-field-based position or movement determination is that it can be carried out without contact. This means that the magnet and magnetic field sensor are separated from each other. This results in significantly less wear compared to position sensors based on mechanical principles.

In many applications in which magnetic field sensors are used, the available installation space is predetermined, e.g., due to design rules. It may be the case here that the magnetic field sensor can only be mounted at a certain specified distance from the magnet. However, the distance, also known as the air gap, cannot be chosen arbitrarily large. Particularly with miniaturized designs, where the magnet is only a few millimeters in size, the air gap should be as small as possible, ideally less than one millimeter, in order to obtain a sufficiently strong signal at the sensor output. The signal strength decreases rapidly as the air gap increases. Even with an air gap of just 2 mm, the signal strength may be insufficient to determine the position of the miniaturized magnet with certainty.

One way to solve this problem is to use a stronger magnet that generates a correspondingly larger magnetic field. However, this usually requires the dimensions of the magnet to be increased. However, this is often not possible due to space restrictions.

It would therefore be desirable to improve miniaturized magnetic-field-based devices in such a way that a sufficiently large sensor signal can be generated despite a large air gap of several millimeters.

This objective is achieved with a device for the magnetic-field-based determination of rotational and/or tilting movements according to claim 1. Further implementations and advantageous aspects of this device are mentioned in the various dependent claims.

The innovative device presented herein has, among other things, a permanent magnet which can be rotated on both sides about a rotation axis and which can be tilted on both sides along a tilting axis extending orthogonally to the rotation axis. The device also has two magnetic field sensors, each of which is configured to measure magnetic vector fields in at least two dimensions, namely at least parallel to the rotation axis and parallel to the tilting axis of the permanent magnet. The magnetic field sensors are arranged on a common substrate and are arranged next to each other along a straight line parallel to the rotation axis of the permanent magnet. In addition, the magnetic field sensors are arranged at a predetermined distance from the outer surface of the permanent magnet.

BRIEF DESCRIPTION OF THE DRAWINGS

Some example implementations are shown in the drawing and are explained below, in which.

DETAILED DESCRIPTION

In the following, example implementations are described in greater detail with reference to the figures, in which elements with the same or similar function are provided with the same reference signs.

Figure 1:
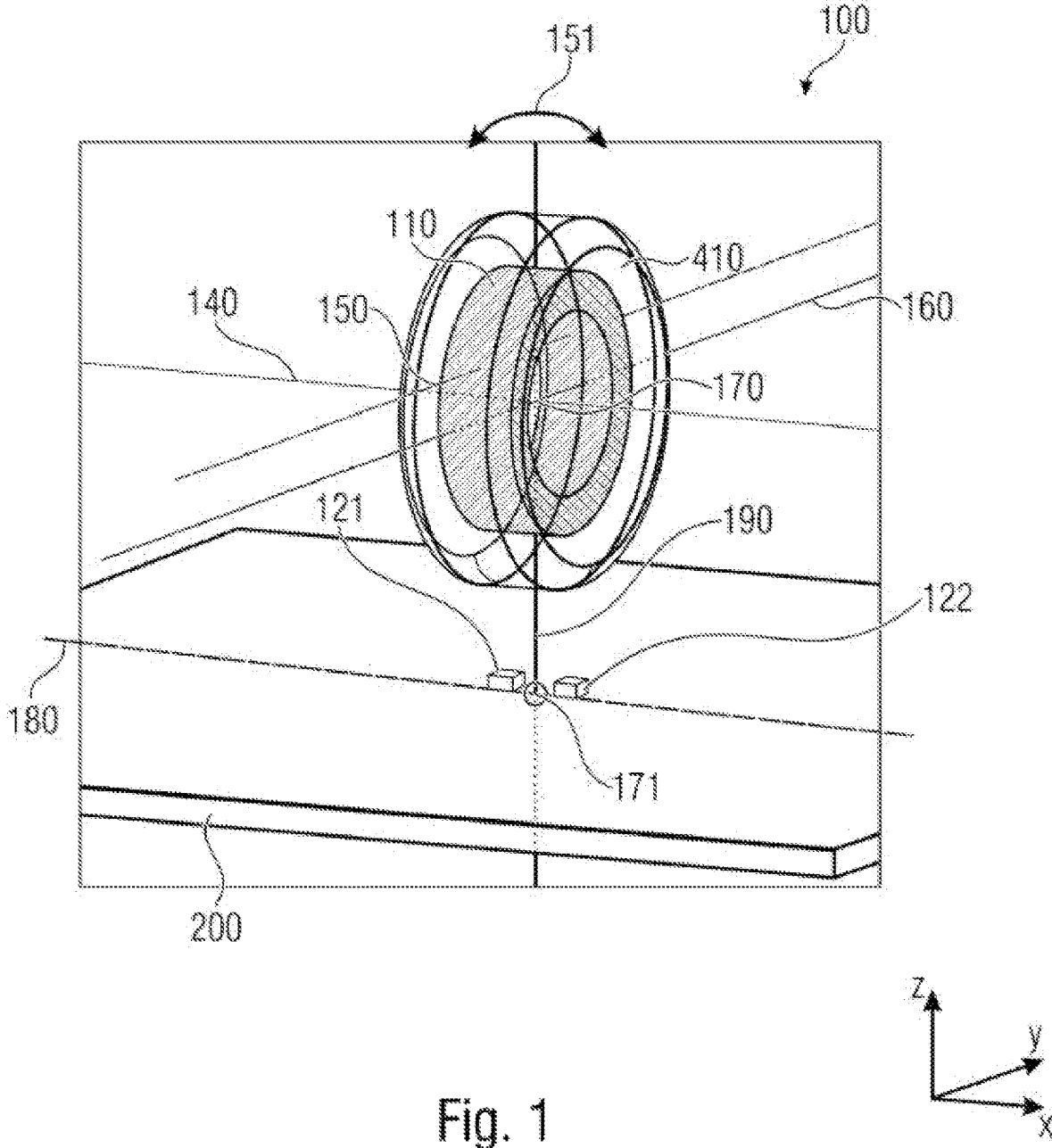
FIG. 1 shows a schematic perspective view of a device according to an example implementation.

FIG. 1 shows a device 100 for the magnetic-field-based determination of rotational and/or tilting movements according to the innovative concept disclosed herein. The device 100 has a permanent magnet 110 and two magnetic field sensors 121, 122. The two magnetic field sensors 121, 122 can be configured in the form of Hall sensors or in the form of magnetoresistive sensors.

The two magnetic field sensors 121, 122 are each configured to measure magnetic vector fields emanating from the permanent magnet 110. These magnetic vector fields vary depending on the position or orientation of the permanent magnet 110 relative to the two magnetic field sensors 121, 122.

The permanent magnet 110 can take the form of a miniaturized magnet. The permanent magnet 110 can have external dimensions in the range of from 5 mm to 25 mm. In the non-limiting example implementation shown here, the permanent magnet 110 is configured in the form of a ring magnet. In this case, the permanent magnet 110 can, for example, have an outer diameter of between 5 mm and 25 mm.

The permanent magnet 100 has a rotation axis 140, about which the permanent magnet 110 can rotate on both sides. The rotation axis 140 can, as shown here as an example, run through the center point 170 of the permanent magnet 110. However, it would also be conceivable that the rotation axis 140 runs off-center and is offset downwards (in the direction of the two magnetic field sensors 121, 122) or upwards.

In addition, the permanent magnet 110 has a tilting axis 150 that is substantially orthogonal to the rotation axis 140. Design-related angular deviations of +10° also fall under the term "orthogonal". Along this tilting axis 150, the permanent magnet 110 can be tilted on both sides from a zero position shown in FIG. 1, which is symbolically represented by the arrow 151.

The two magnetic field sensors 121, 122 are each configured to measure magnetic vector fields emanating from the permanent magnet 110 in at least two dimensions, namely at least parallel to the rotation axis 140 and parallel to the tilting axis 150 of the permanent magnet 110. In other words, the two magnetic field sensors 121, 122 can be configured in the form of 2D sensors that can measure the magnetic field emanating from the permanent magnet 110 in the x and y directions. The x and y directions each run in-plane, e.g., in the substrate plane or parallel to the substrate surface.

However, the two magnetic field sensors 121, 122 can also be configured as three-dimensionally measuring 3D sensors, which can measure the magnetic field emanating from the permanent magnet 110 in all three spatial directions, e.g., in the x, y and z directions. The z-direction runs out-of-plane, e.g., perpendicularly out of the substrate plane.

The two magnetic field sensors 121, 122 are arranged on a common substrate 200. The substrate 200 can be in the form of a single circuit board, for example in the form of a PCB (Printed Circuit Board), and the two magnetic field sensors 121, 122 can be mounted on this single circuit board 200 without additional further circuit boards or PCBs.

The magnetic field sensors 121, 122 can, for example, each be mounted individually on the circuit board 200. Alternatively, however, it would also be conceivable that the two magnetic field sensors 121, 122 are integrated in a common chip, wherein this chip could in turn be mounted on the circuit board 200. In any case, the two magnetic field sensors 121, 122 are spaced apart from the outer surface of the permanent magnet 110.

The two magnetic field sensors 121, 122 are also arranged along a straight line 180, which runs parallel to the rotation axis 140 of the permanent magnet 110. The two magnetic field sensors 121, 122 are arranged next to each other along this straight line 180. Furthermore, the two magnetic field sensors 121, 122 are spaced apart from one another along this straight line 180. The distance can depend on several factors. In order to be able to detect a tilting of the permanent magnet 110 as error-free as possible, it would be advantageous if the distance between the two magnetic field sensors 121, 122 were as large as possible. However, a large distance can lead to the magnetic field of the permanent magnet 110 no longer reaching the two magnetic field sensors 121, 122 to a sufficient extent, e.g., the magnetic field strength would then no longer be sufficient to be able to determine the position of the permanent magnet 110.

A solution to this trade-off can be provided with the innovative concept presented herein by selecting the distance between the two magnetic field sensors 121, 122 to be greater than or equal to the thickness of the permanent magnet 110. The thickness of the permanent magnet 110 is measured here along the rotation axis 140 or parallel thereto. Viewed from above, the two magnetic field sensors 121, 122 can therefore project beyond the outer contours of the permanent magnet 110.

Advantageously, the two magnetic field sensors 121, 122 can be arranged exactly below the permanent magnet 110. That is to say, the center point 171 between the two magnetic field sensors 121, 122 spaced apart from each other and the center point 170 of the permanent magnet 110 may lie on a common straight line 190, wherein this common straight line 190 is substantially perpendicular to the rotation axis 140 of the permanent magnet 110 and substantially perpendicular to the substrate surface. The two magnetic field sensors 121, 122 can thus be arranged exactly below the center point 170 of the permanent magnet 110 and can each be equally spaced from the center point 170 of the permanent magnet 110.

The two magnetic field sensors 121, 122 are configured to determine the actual position, e.g., the current rotation angle and/or the current tilt angle, of the permanent magnet 110 using the magnetic vector field of the permanent magnet 110. The current rotation angle and/or the current tilt angle indicate the current orientation of the permanent magnet 110 relative to the two magnetic field sensors 121, 122.

The two magnetic field sensors 121, 122 can measure the actual position of the permanent magnet 110 differentially, for example. For this purpose, the device 100 can have a control unit (not explicitly shown here) which is configured to combine the respective output signals of the two magnetic field sensors 121, 122 with one another and, based on the combined signal, to ascertain the current angle of rotation and/or the current tilt angle of the permanent magnet 110. The combined signal may, for example, be a sum or a difference of the two sensor output signals.

This type of measurement is advantageous as it allows homogeneous stray fields, e.g., external magnetic interference fields, to be compensated for. Signal fluctuations or signal distortions caused by external interference can also be compensated for. These include temperature-related signal fluctuations.

The two magnetic field sensors 121, 122 can be temperature-sensitive, wherein different measured values can occur at the sensor output at different temperatures. This effect can be compensated for with a differential measurement, which is possible with the at least two magnetic field sensors 121, 122 in the arrangement disclosed herein. In conceivable implementations, the device 100 may also have exactly two magnetic field sensors 121, 122, because exactly two magnetic field sensors 121, 122 may be sufficient to realize the innovative concept described herein.

The provision of two magnetic field sensors 121, 122 has a further advantage. Namely, two sensor signals are obtained, which can be used to double the signal strength. As mentioned at the outset, the respective output signals of the two magnetic field sensors 121, 122 can be combined with each other, for example to obtain a combined or common signal with a correspondingly greater amplitude.

Due to the increased signal amplitude, the distance between the outer surface of the permanent magnet 110 and the two magnetic field sensors 121, 122 can be significantly increased compared to conventional magnetic-field-based devices. For example, the distance may be at least 2 mm or more. In some example implementations, the distance may be 6 mm or more.

The use of two magnetic field sensors 121, 122 in the arrangement described herein has a further advantage. Since the two magnetic field sensors 121, 122 are arranged along the straight line 180, which runs parallel to the rotation axis 140 and orthogonal to the tilting axis 150, the two magnetic field sensors 121, 122 can detect a tilting of the permanent magnet 110 along its tilting axis 150.

When the permanent magnet 110 is tilted in a first direction (e.g., to the right), the magnetic field at the first magnetic field sensor 121 increases, while the magnetic field strength at the second magnetic field sensor 122 decreases. If the permanent magnet 110 is tilted in an opposite, second direction (e.g., to the left), the magnetic field strength at the first magnetic field sensor 121 weakens, while the magnetic field strength at the second magnetic field sensor 122 increases. Alternatively or in addition to measuring the magnetic field strength, the tilt can be ascertained based on the changing magnetic vector field, e.g., based on the direction of the magnetic field vectors.

Figure 2A:
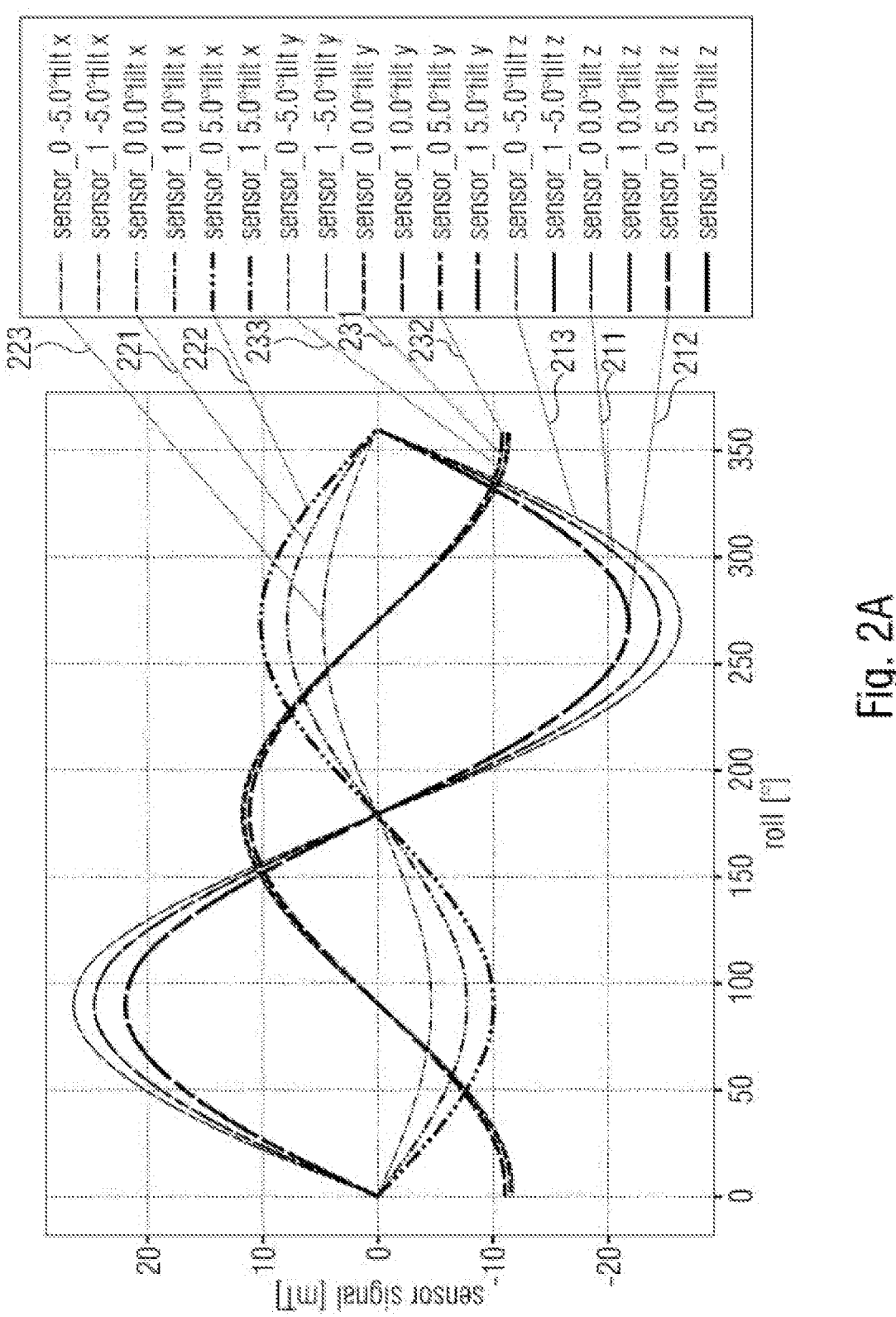
FIGS. 2A-2C show different sensor output signals of the two magnetic field sensors at different positions of the permanent magnet according to example implementations.

FIG. 2A for this purpose first shows the signal curve of the first magnetic field sensor 121 (sensor_0) when the permanent magnet 110 rotates by a full 360°. The abscissa axis shows the rotational position of the permanent magnet 110 in degrees, and the magnetic field strength measured by the first magnetic field sensor 121 is plotted on the ordinate axis. In this example, the first magnetic field sensor 121 is configured in the form of a 3D sensor that can measure the magnetic vector field in all three spatial directions.

The curves 211, 212, 213 show the sensor output signal, measured in the z-direction (perpendicular to the rotation axis 140 or perpendicular to the substrate surface). The curve 211 shows the sensor output signal in the tilt-zero position of the permanent magnet 110, e.g., without tilting. The curve 212 shows the sensor output signal when the permanent magnet 110 is tilted by +5°. Curve 213 shows the sensor output signal when the permanent magnet 110 is tilted by −5°.

The curves 221, 222, 223 show the sensor output signal, measured in the x-direction (e.g., parallel (alternatively orthogonal) to the rotation axis 140). The curve 221 shows the sensor output signal in the tilt-zero position of the permanent magnet 110, e.g., without tilting. The curve 222 shows the sensor output signal when the permanent magnet 110 is tilted by +5°. The curve 223 shows the sensor output signal when the permanent magnet 110 is tilted by −5°.

The curves 231, 232, 233 show the sensor output signal measured in the y-direction (e.g., orthogonal (alternatively parallel) to the rotation axis 140). The curve 231 shows the sensor output signal in the tilt-zero position of the permanent magnet 110, e.g., without tilting. The curve 232 shows the sensor output signal when the permanent magnet 110 is tilted by +5°. The curve 233 shows the sensor output signal when the permanent magnet 110 is tilted by −5°.

Figure 2B:
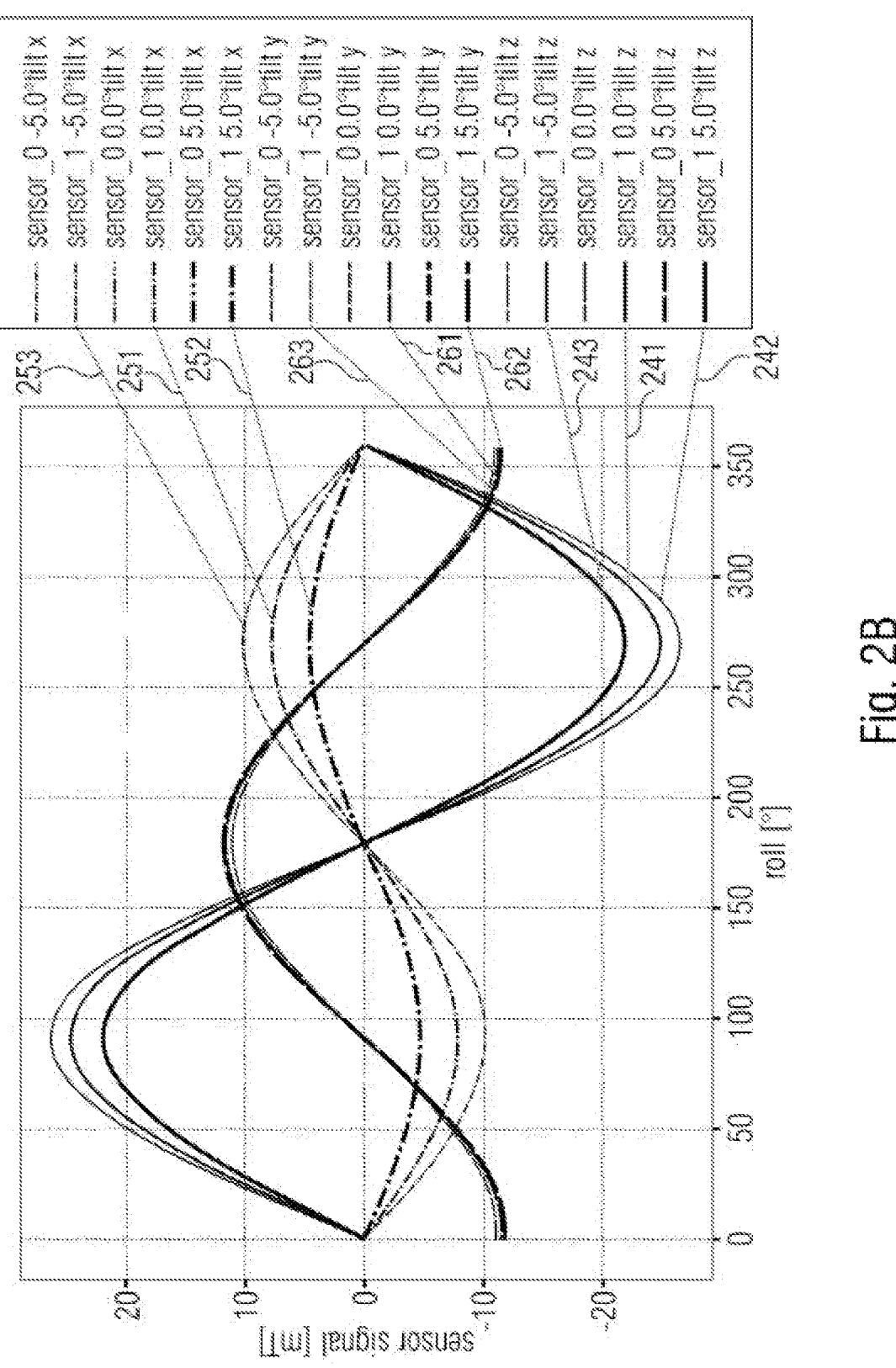

FIG. 2B shows the signal curve of the second magnetic field sensor 122 (sensor_1) when the permanent magnet 110 is rotated by a full 360°. The abscissa axis shows the rotational position of the permanent magnet 110 in degrees, and the magnetic field strength measured by the second magnetic field sensor 122 is plotted on the ordinate axis. In this example, the second magnetic field sensor 122 is configured in the form of a 3D sensor that can measure the magnetic vector field in all three spatial directions.

The curves 241, 242, 243 show the sensor output signal measured in the z-direction (perpendicular to the rotation axis 140). The curve 241 shows the sensor output signal in the tilt-zero position of the permanent magnet 110, e.g., without tilting. The curve 242 shows the sensor output signal when the permanent magnet 110 is tilted by +5°. The curve 243 shows the sensor output signal when the permanent magnet 110 is tilted by −5°.

The curves 251, 252, 253 show the sensor output signal, measured in the x-direction (e.g., parallel (alternatively orthogonal) to the rotation axis 140). The curve 251 shows the sensor output signal in the tilt-zero position of the permanent magnet 110, e.g., without tilting. The curve 252 shows the sensor output signal when the permanent magnet 110 is tilted by +5°. The curve 253 shows the sensor output signal when the permanent magnet 110 is tilted by −5°.

The curves 261, 262, 263 show the sensor output signal measured in the y-direction (e.g., orthogonal (alternatively parallel) to the rotation axis 140). The curve 261 shows the sensor output signal in the tilt-zero position of the permanent magnet 110, e.g., without tilting. The curve 262 shows the sensor output signal when the permanent magnet 110 is tilted by +5°. The curve 263 shows the sensor output signal when the permanent magnet 110 is tilted by −5°.

Figure 2C:
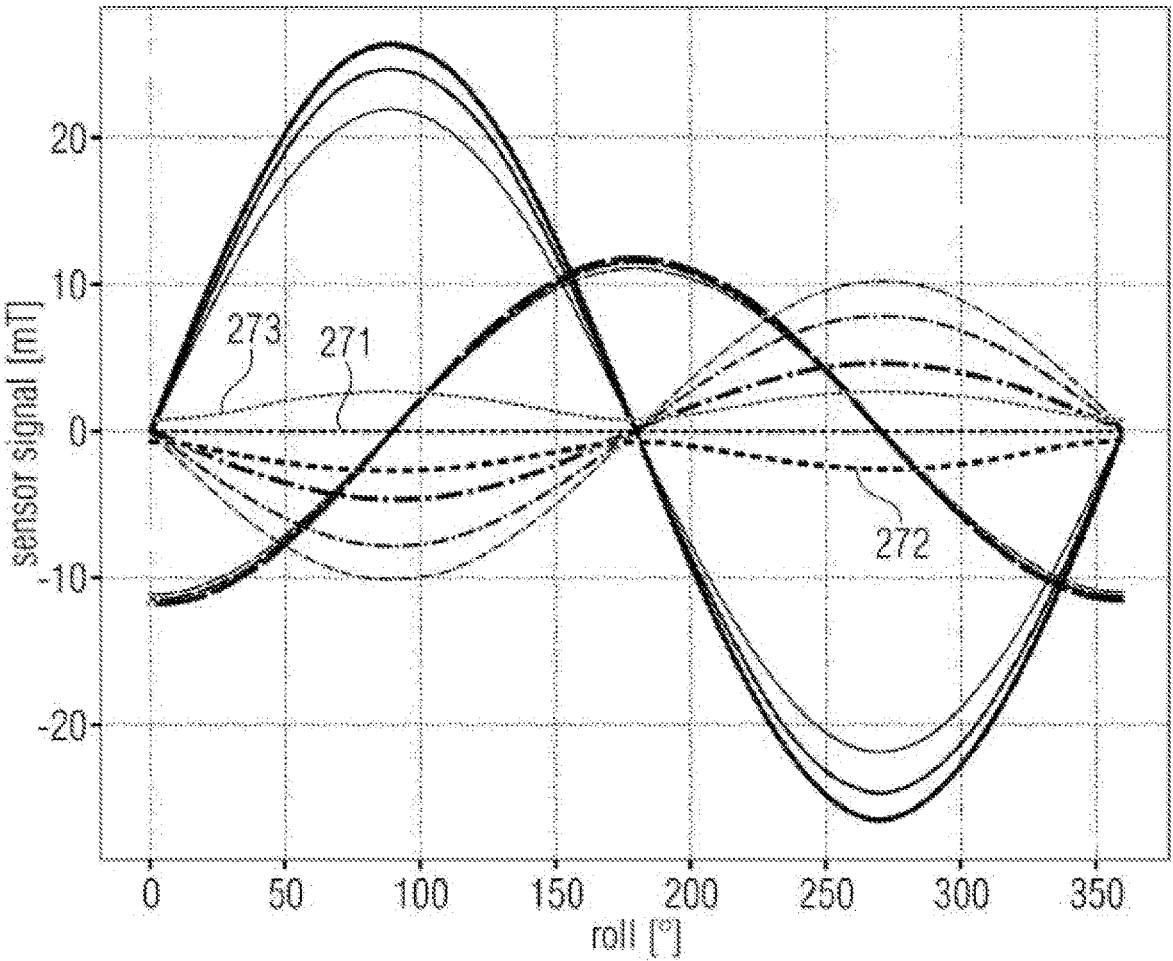

FIG. 2C shows a superposition of the previously discussed sensor output signals of the two magnetic field sensors 121, 122. Using a suitable combination of these sensor output signals, the tilting of the permanent magnet 110 can be determined. This can be done, for example, using the following formula:

$$\text{Tilting} = \sqrt[2]{\text{sensor0\_x\_value}^2 + \text{sensor0\_y\_value}^2 + \text{sensor0\_z\_value}^2} -$$
$$\sqrt[2]{\text{sensor1\_x\_value}^2 + \text{sensor1\_y\_value}^2 + \text{sensor1\_z\_value}^2}.$$

This means that the sensor output signals of the first magnetic field sensor 121 in all three spatial directions can each be squared and summed. The sensor output signals of the second magnetic field sensor 122 in all three spatial directions can also be squared and summed. The square root of the summed squares of the sensor output signals of the second magnetic field sensor 122 can then be subtracted from the square root of the summed squares of the sensor output signals of the first magnetic field sensor 121.

This results in the curves 271, 272, 273 shown in FIG. 2C. The curve 271 running over the full angular range through the zero point symbolizes the sensor output signal combined according to the above formula in the tilted zero position of the permanent magnet 110, e.g., without tilting. The curve 272 symbolizes the sensor output signal combined according to the above formula when the permanent magnet 110 is tilted by +5°. The curve 273 symbolizes the sensor output signal combined according to the above formula when the permanent magnet 110 is tilted by −5°.

It should be noted that all numerical values discussed and illustrated here, e.g., the degree of tilt and the magnetic field strengths shown, are merely example and are in no way limiting.

For further explanation of the tilting of the permanent magnet 110, reference is made below again to FIG. 1 and FIGS. 3A, 3B and 3C.

FIG. 1 first shows a center axis 160 orthogonal to the rotation axis 140 and intersecting the rotation axis 140 at the center point 170 of the permanent magnet 110. The tilting axis 150 can run centrally or off-center. For example, as schematically indicated in FIG. 1, the tilting axis 150 can extend off-center through the permanent magnet 110 by being offset in a direction away from the magnetic field sensors 121, 122 so that it extends above the center point 170 of the permanent magnet 110. Alternatively, it would be conceivable that the tilting axis 150 is offset in a direction towards the magnetic field sensors 121, 122 so that it extends below the center point 170 of the permanent magnet 110. It would also be conceivable that the tilting axis 150 is arranged centrally, wherein the tilting axis 150 would intersect the center point 170 of the permanent magnet 110. Incidentally, all of this can also apply to the rotation axis 140 of the permanent magnet 110.

A central arrangement of the tilting axis 150 is advantageous in that a central suspension of the permanent magnet 110 is structurally simple to implement. An off-center arrangement with an upward offset of the tilting axis 150 is advantageous, since, during a tilting movement of the permanent magnet 110, the lower portion of the permanent magnet 110, which is located in the vicinity of the magnetic field sensors 121, 122, swings out further compared to the central suspension. As a result, the tilting of the permanent magnet 110 can be better detected by the two magnetic field sensors 121, 122. An off-center arrangement with a downward offset of the tilting axis 150 can be advantageous if, for example, there are installation space limitations.

Figure 3A:
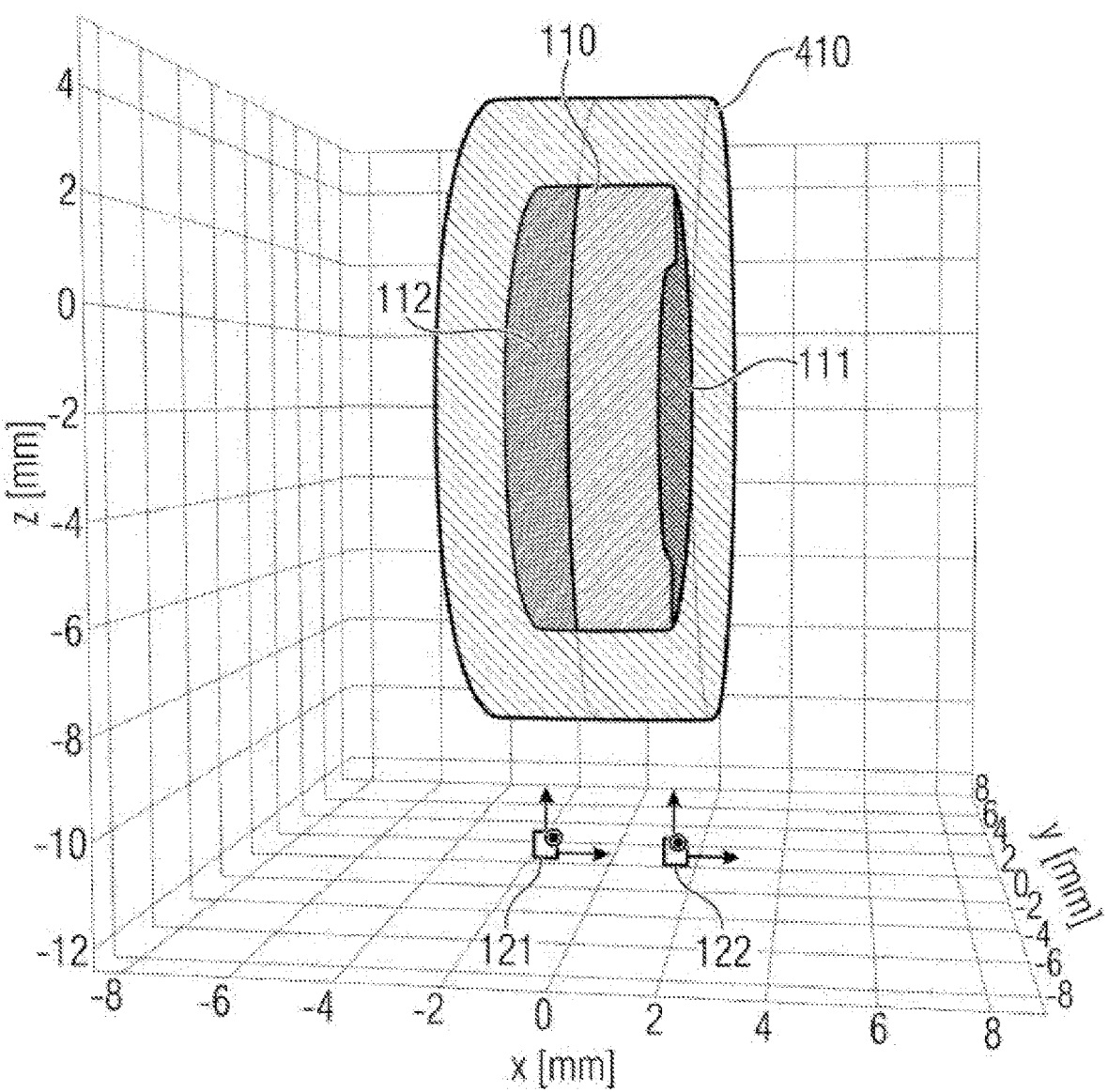
FIGS. 3A-3C show different positions of the permanent magnet relative to the magnetic field sensors according to example implementations.
Figure 3B:
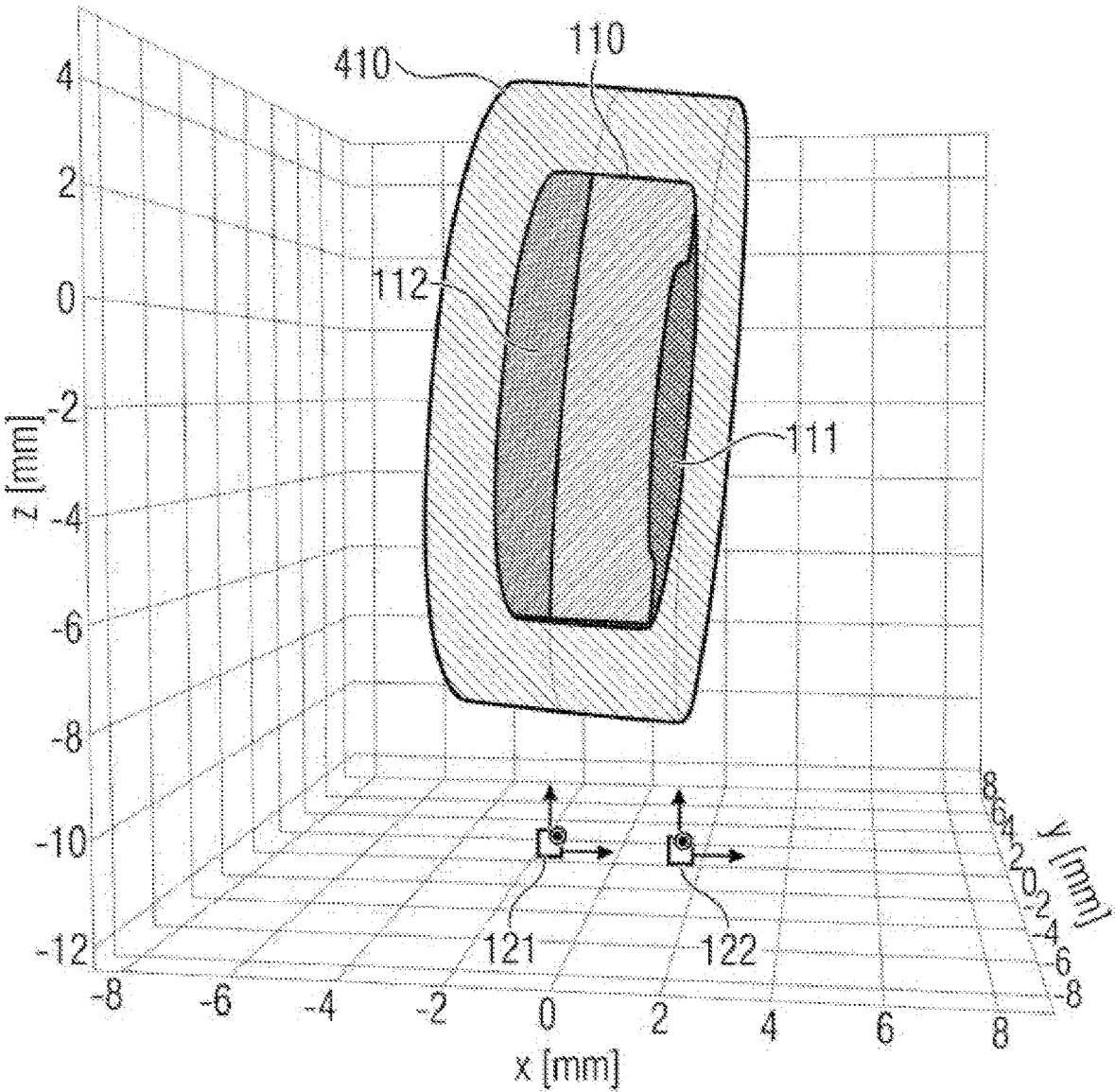
Figure 3C:
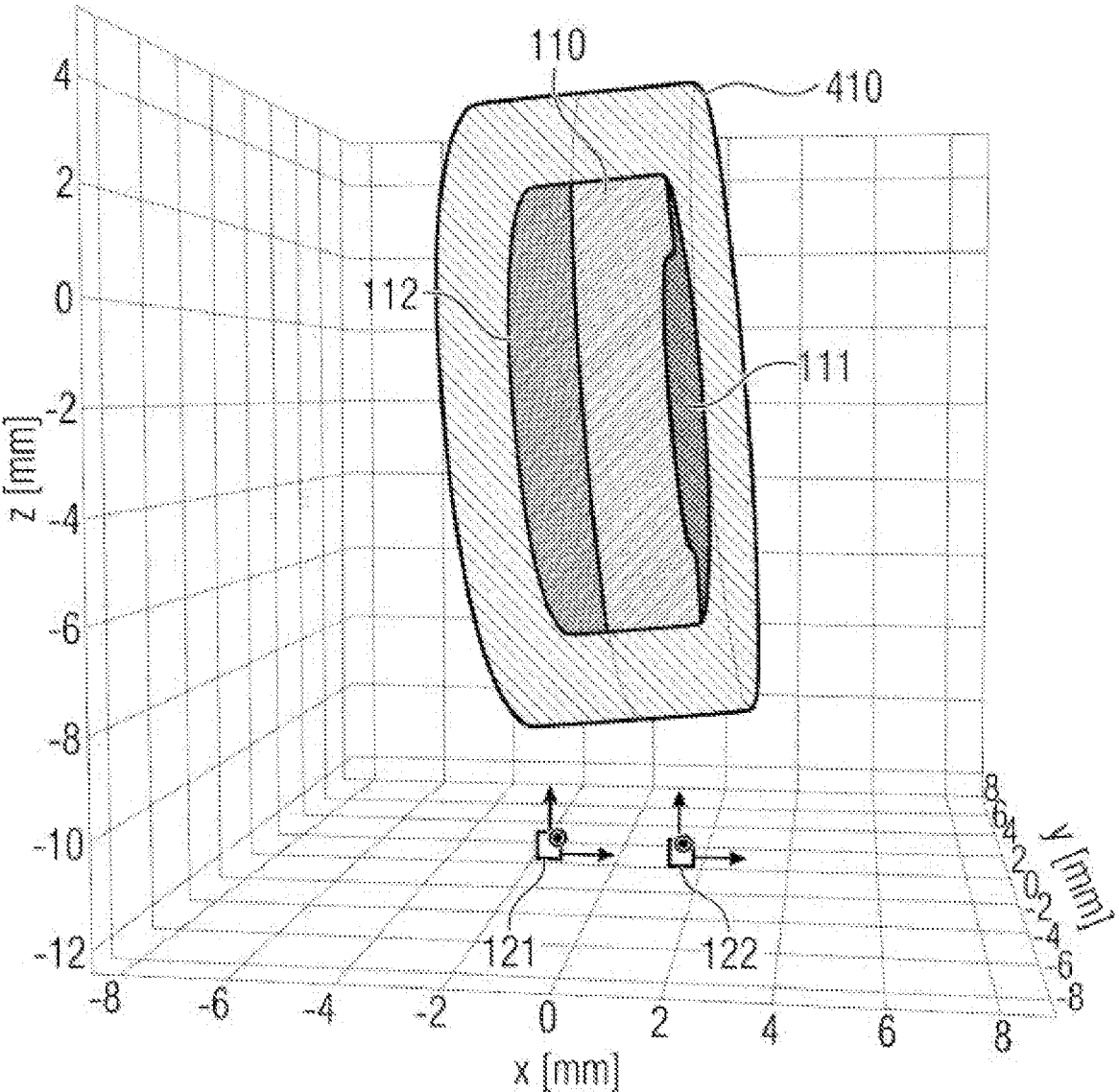

FIG. 3A shows a frontal view of the permanent magnet 110 in the tilt-zero position, e.g., without tilting. FIG. 3B shows the permanent magnet 110 in a position in which it is tilted to the right (e.g., by 5°). FIG. 3C shows the permanent magnet 110 in a position in which it is tilted to the left (e.g., by 5°). Since the lower and upper portions of the permanent magnet 110 swing out to the left and right respectively, this tilting movement of the permanent magnet 110 can also be referred to as a pivoting movement.

As can also be seen in FIGS. 3A to 3C, the permanent magnet 110 can, for example, be configured in the form of a diametrically magnetized ring magnet. This means that half of the permanent magnet 110 has a magnetic south pole 111 and the other half has a magnetic north pole 112. The poles are each arranged in a semi-circle around the rotation axis 140. As a result, when the permanent magnet 110 rotates, its magnetic vector field changes at the location of the magnetic field sensors 121, 122.

However, it would also be conceivable for the permanent magnet 110 to be in the form of a diametrically magnetized cylindrical magnet. The permanent magnet 110 can also be configured in the form of a pill. In general, the permanent magnet 110 can be configured in the form of any rotationally symmetrical body. This should preferably be magnetized in such a way that when the permanent magnet 110 rotates, its magnetic field changes relative to the magnetic field sensors 121, 122. In the case of rotationally symmetrical bodies, this can in particular involve diametrical magnetization.

The innovative concept presented herein for the magnetic-field-based determination of rotational and/or tilting movements can be used in numerous applications. As a non-limiting example implementation, a steering wheel or a component of a steering wheel for a motor vehicle is mentioned. In such a steering wheel component, for example, control buttons can be integrated for controlling a wide variety of vehicle functions, such as the operation of the infotainment system including radio and telephone control buttons. Such a control button can be configured in the form of a so-called thumbwheel, for example.

The thumbwheel is used, for example, as an input device for operating controls or for controlling or selecting software functions, for example in a vehicle infotainment system. For this purpose, a user can move the thumbwheel with their thumb when holding the steering wheel in their hand in accordance with regulations. The thumbwheel can be rotated and tilted.

Reference is also made once again to the partially transparent views in FIGS. 1, 3A, 3B and 3C, in which both a schematically indicated thumbwheel 410 and a permanent magnet 110 integrated therein are shown. The previously discussed permanent magnet 110 may be disposed within the thumbwheel 410. The thumbwheel 410 may be made of plastic, for example, and the permanent magnet 110 may be molded into the thumbwheel 410 or otherwise mechanically fixed.

The rotation axis of the thumbwheel 410, which is not explicitly shown in the figures, can correspond to the rotation axis 140 of the permanent magnet 110 shown in FIG. 1. For example, the rotation axis of the thumbwheel 410 may form the rotation axis 140 of the permanent magnet 110. The same applies to the tilting axis of the thumbwheel 410, which is not explicitly shown in the figures, and the tilting axis 150 of the permanent magnet 110 shown in FIG. 1.

When the thumbwheel 410 rotates, the permanent magnet 110 also rotates, and the magnetic field sensors 121, 122 can detect the rotational movement in the manner described above. The same applies to a tilting movement of the thumbwheel 410.

The substrate 200, for example in the form of a circuit board, can also be arranged within the aforementioned steering wheel component. The substrate 200 and the thumbwheel 410 can be arranged opposite one another, wherein the thumbwheel 410 can be arranged at a certain distance from the substrate 200. As a result, the permanent magnet 110 integrated in the thumbwheel 410 is also spaced apart from the substrate 200. The thumbwheel 410 and the permanent magnet 110 are thus also spaced at a certain distance from the magnetic field sensors 121, 122, which are arranged on the substrate 200.

Among other things, this distance can be based on the size of the thumbwheel 410, e.g., the larger the thumbwheel 410 is, the greater the distance between the permanent magnet 110 and the magnetic field sensors 121, 122 will be. However, structural specifications can also determine the distance between the substrate 200 and the thumbwheel 410. A greater distance inevitably leads to a weakening of the detectable magnetic field strength at the magnetic field sensors 121, 122. However, as described in detail above, this circumstance can be countered with the innovative concept described herein.

The innovative device 100 disclosed here also has other advantages, such as: signal strength increase by "doubling" the signal using two magnetic field sensors 121, 122; cancellation of temperature effects; structure can be realized with very large air gaps; no additional circuit boards, e.g., PCBs (Printed Circuit Boards), necessary to reduce the distance between the thumbwheel 410 or permanent magnet 110 and the substrate 200 or the magnetic field sensors 121, 122; and stable against mechanical tolerances.

The example implementations described above are merely illustrative of the principles of the innovative concept described herein. It is understood that modifications and variations of the arrangements and details described herein will be apparent to others skilled in the art. Therefore, it is intended that the concept described herein be limited only by the scope of protection of the following claims and not by the specific details presented by the description and explanation of the example implementations herein.

Although some aspects have been described in conjunction with a device, it is understood that these aspects also constitute a description of the corresponding method, so that a block or a component of a device is also to be understood as a corresponding method step or as a feature of a method step. Similarly, aspects described in conjunction with or as a method step also constitute a description of a corresponding block or detail or feature of a corresponding device.

The invention claimed is:

1. A device for magnetic-field-based determination of movements, comprising:
a permanent magnet configured to:
rotate about a rotation axis, and
tilt along a tilting axis extending orthogonally to the rotation axis, two magnetic field sensors configured to:
measure magnetic vector fields in at least two dimensions,
wherein the magnetic field sensors are arranged on a common substrate and are arranged side by side along a straight line parallel to the rotation axis of the permanent magnet, and
wherein the magnetic field sensors are spaced from an outer surface of the permanent magnet.

2. The device as claimed in claim 1, wherein the device has exactly two magnetic field sensors.

3. The device as claimed in claim 1, further comprising:
a control unit configured to:
combine respective output signals of the two magnetic field sensors to generate a combined signal, and
determine, based on the combined signal, a current angle of rotation of the permanent magnet and/or a current tilt angle of the permanent magnet.

4. The device as claimed in claim 1, wherein the permanent magnet comprises a rotationally symmetrical body, wherein a magnetic vector field of the rotationally symmetrical body changes at a location of the magnetic field sensors based on a rotation of the permanent magnet.

5. The device as claimed in claim 4, wherein the permanent magnet has a diameter of between 5 mm and 25 mm.

6. The device as claimed in claim 1, wherein the permanent magnet comprises a diametrically magnetized ring magnet or a diametrically magnetized cylindrical magnet.

7. The device as claimed in claim 1, wherein the magnetic field sensors are arranged at a distance of more than 2 mm from an outer surface of the permanent magnet.

8. The device as claimed in claim 1, wherein the magnetic field sensors are spaced apart along the straight line parallel to the rotation axis of the permanent magnet.

9. The device as claimed in claim 8, wherein a center point between the two magnetic field sensors and a center point of the permanent magnet are positioned on a common straight line, wherein the common straight line extends perpendicular to the rotation axis of the permanent magnet.

10. The device as claimed in claim 8, wherein the permanent magnet has a thickness to be dimensioned parallel to the rotation axis, and
wherein a distance between the magnetic field sensors is greater than or equal to a thickness of the permanent magnet.

11. The device as claimed in claim 1, wherein the tilting axis of the permanent magnet intersects a center point of the permanent magnet.

10

12. The device as claimed in claim 1, wherein the tilting axis is offset in a direction towards the magnetic field sensors and extends below a center point of the permanent magnet, or
wherein the tilting axis is offset in a direction away from the magnetic field sensors and extends above the center point of the permanent magnet.

13. The device as claimed in claim 1, wherein the common substrate comprises a single circuit board, and
wherein the two magnetic field sensors are mounted on the single circuit board without additional circuit boards.

14. The device of claim 1, wherein the at least two dimensions include a first direction that is parallel to the rotation axis of the permanent magnet and a second direction that is parallel to the tilting axis of the permanent magnet.

15. A system comprising:
a device for magnetic-field-based determination of movements, comprising:
a permanent magnet configured to:
rotate about a rotation axis, and
tilt along a tilting axis extending orthogonally to the rotation axis, two magnetic field sensors configured to:
measure magnetic vector fields in at least two dimensions,
wherein the magnetic field sensors are arranged on a common substrate and are arranged side by side along a straight line parallel to the rotation axis of the permanent magnet, and
wherein the magnetic field sensors are spaced from an outer surface of the permanent magnet; and
a rotatable and tiltable thumbwheel,
wherein the permanent magnet is arranged within the rotatable and tiltable thumbwheel, and
wherein the common substrate with the two magnetic field sensors is spaced apart from the rotatable and tiltable thumbwheel.

16. The system of claim 15, wherein the at least two dimensions include a first direction that is parallel to the rotation axis of the permanent magnet and a second direction that is parallel to the tilting axis of the permanent magnet.

17. The system of claim 15, wherein the permanent magnet comprises a rotationally symmetrical body, wherein a magnetic vector field of the rotationally symmetrical body changes at a location of the magnetic field sensors based on a rotation of the permanent magnet.

18. The system of claim 17, wherein the permanent magnet has a diameter of between 5 mm and 25 mm.

19. A steering wheel for a vehicle comprising:
a device for magnetic-field-based determination of movements, comprising:
a permanent magnet configured to:
rotate about a rotation axis, and
tilt along a tilting axis extending orthogonally to the rotation axis, two magnetic field sensors configured to:
measure magnetic vector fields in at least two dimensions,
wherein the magnetic field sensors are arranged on a common substrate and are arranged side by side along a straight line parallel to the rotation axis of the permanent magnet, and
wherein the magnetic field sensors are spaced from an outer surface of the permanent magnet; and
a rotatable and tiltable thumbwheel, wherein the permanent magnet is arranged within the rotatable and tiltable thumbwheel, and wherein the common substrate with the two magnetic field sensors is spaced apart from the rotatable and tiltable thumbwheel.

20. The steering wheel of claim 19, wherein the at least two dimensions include a first direction that is parallel to the rotation axis of the permanent magnet and a second direction that is parallel to the tilting axis of the permanent magnet.

* * * * *